F. P. THIEN & F. G. GUENTHER.
BAKE PAN.
APPLICATION FILED APR. 15, 1912.
1,069,204.
Patented Aug. 5, 1913.
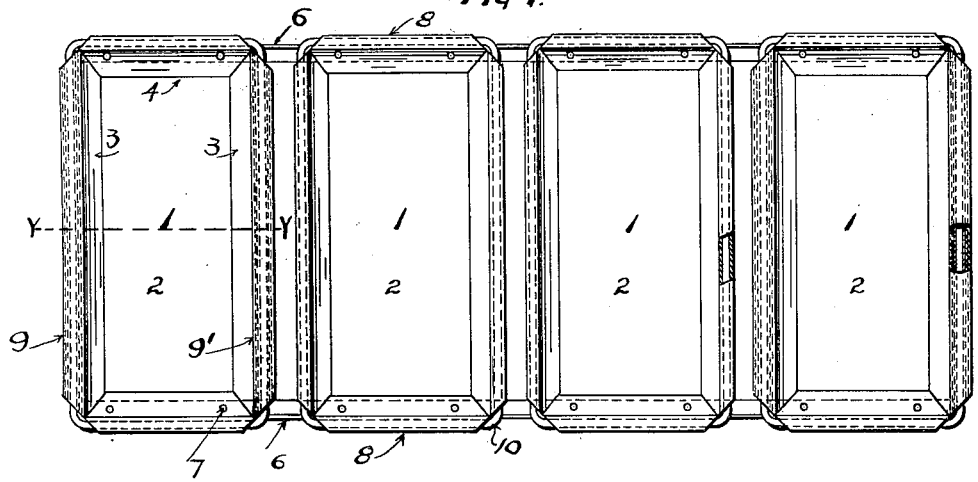
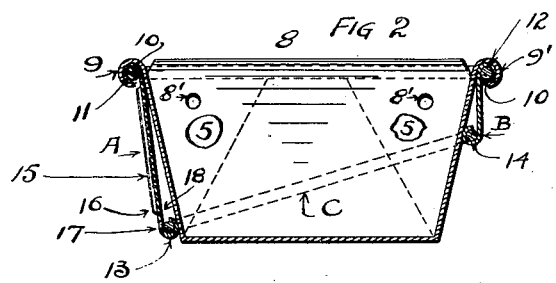
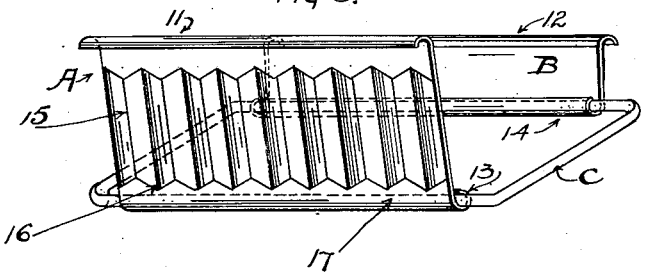
Witnesses:
a. M. Cooper
C. H. Johnson.
Inventors:
Frank P. Thien
Frank G. Guenther
By Michael J. Stark & Sons
attys

UNITED STATES PATENT OFFICE.

FRANK P. THIEN AND FRANK G. GUENTHER, OF CHICAGO, ILLINOIS.

BAKE-PAN.

1,069,204.   Specification of Letters Patent.   Patented Aug. 5, 1913.

Application filed April 15, 1912. Serial No. 690,778.

*To all whom it may concern:*

Be it known that we, FRANK P. THIEN and FRANK G. GUENTHER, citizens of the United States, and residents of the city of Chicago, in the county of Cook and State of Illinois, have invented certain new and useful Improvements in Bake-Pans; and we do hereby declare that the following description of our said invention, taken in connection with the accompanying sheet of drawings, forms a full, clear, and exact specification, which will enable others skilled in the art to which it appertains to make and use the same.

This invention has general reference to improvements in bake pans; in particular, to that class of pans for baking bread in commercial bake shops.

It consists, essentially, in the novel and peculiar combination of parts as hereinafter first fully set forth and described, and then pointed out in the claims.

The object of our invention is the production of a cheap, yet at the same time efficient bake pan, possessing lasting qualities beyond such as at present produced. Another object is to provide a reinforcement for the pans at a point where the impact of a blow from the baker's peel is usually delivered when forcing the same under the pans when they are removed from the bake oven.

We are aware that bake pans with reinforcements have been made before, but in all such cases the reinforcing members have been riveted to the pan proper, necessitating the puncturing of the walls of the pan and reinforcement for the reception of proper rivets. This is an objectionable feature, as the punctures in the tin plate exposes the black iron under the tin coating and renders it susceptible to rust. Moreover, the rivet heads on the inner surface of the pans mar the smooth interior thereof, and makes the removal of the baked bread more difficult. Therefore, our invention contemplates the production of a reinforcement which is applied to the outer pans of a set (usually four pans affixed together in spaced relation to each other with spaces between each pan, to insure even baking of the contents) without the use of rivets, screws, or studs and without puncturing, mutilating, or otherwise defacing the interior walls of the pans. It further contemplates a further reinforcement at the point of impact of the peel, and novel means for deflecting the point of said impact to the place of greatest reinforcement.

In the drawings already referred to, which serve to illustrate our invention more fully, Figure 1 is a plan of a set of four pans or trays comprising a so-called bake pan. Fig. 2 is a transverse sectional elevation in line Y. Y. of Fig. 1. Fig. 3 is a perspective view of the reinforcing members before being attached to the pans or trays.

Like parts are designated by corresponding symbols or characters of reference in all the figures.

Our bake pan comprises a set of usually four rectangular trays 1, having bottoms 2, sides 3, and ends 4, all preferably formed up from a single sheet, with overlapping folds 5, for stiffening purposes at the corners. These trays are connected in spaced relation to each other by light metallic bars 6 and rivets 7, there being punctures 8', in the ends of the trays and corresponding holes in the sides of the bars 6, to receive the rivets 7, already mentioned.

The upper edges of the sides 3 and ends 4 are curled outwardly at 8, 9, and 9', to embrace and curl around a wire 10, which is bent into rectangular contour, and also to inclose beads 11 and 12, of the pan reinforcement hereinafter to be described. These curled portions 8, 9, and 9', therefore serve the double purpose of not only stiffening the upper edges of the trays or pans, but also form the lock or "hold" of the reinforcing members. It should now be understood that our reinforcement is only applied to the outer sides of the exterior pans or trays of the set, they being the only ones that come in contact with the baker's peel.

The reinforcement already referred to consists, first, of a comparatively light metallic strip A, the length of which is slightly less than that of the side 3 of the pan or tray 1, and of a width nearly equal to the depth thereof. Along its upper edge is formed an open U-shaped bead or curl 11, which embraces the wire 10, already mentioned and is embraced by the curled portion 9, hereinbefore referred to. On the lower edge of this strip A, is formed a turned edge 13, which totally incloses a wire C, as shown in Figs. 2 and 3. This wire is bent into the shape of an open rectangle and passes around the ends of the pan or tray to the opposite side where it is locked in a turned edge 14 of a metallic strip B, at a point nearly adjacent to the top edge of the tray. This strip B, has an open U-shaped bead 12, along its upper edge which passes over the wire 6, before mentioned, and is held in position thereon by the curled portion 9′, in the same manner as the bead 11 of the strip A is held in fixed position by the curl 9 of the pan or tray 1.

In the face of the reinforcing strip A, are formed a series of deep, sharp corrugations 15, the entire length thereof and extending laterally of the strip. They merge into the face of the strip at a point slightly below the head 11, at the upper end, and terminate abruptly at 16, Fig. 2, near the lower end. These corrugations 15 serve a triple function; first, enabling us to make the strip A of much lighter material than would otherwise be possible; second, in imparting greater stiffness to the strip to resist the impact of the baker's peel, and, lastly, the lower edge terminating abruptly, will deflect the point of the peel downwardly to the point 17, where the reinforcement is greatest by reason of the backing of the wire C, so that the impact of the blow is taken at the point where the reinforcement is best able to absorb it. It will now be observed that forming the edge 13 on the inside of the strip A, we secure an air space 18, between it and the side of the pan or tray, allowing ample heat circulation therebetween and thereby not impeding the evenness of the baking processes.

Having thus fully described our invention, we claim as new and desire to secure to us by Letters Patent of the United States:—

1. A bake pan comprising a bottom, sides, ends, and beads along the upper edges thereof, a reinforcing strip for one side of said pan having its upper edge embraced by the bead on said side, means engaging the lower edge of said strip, said means extending to the opposite side of said pan, and means there located to maintain the first mentioned means in position.

2. A bake pan comprising a bottom, sides, ends, and beads along the upper edges thereof, a reinforcing strip for one side of said pan having its upper edge embraced by the bead on said side, means engaging the lower edge of said strip and extending around the ends of said pan to the opposite side thereof, and means there located to maintain the first mentioned means in position.

3. A bake pan comprising a bottom, sides, ends, and beads along the upper edges thereof, a reinforcing strip for one side of said pan having its upper edge embraced by the bead on said side, means engaging the lower edge of said strip and extending parallel to the ends of said pan, and adjacent thereto, to the opposite side of said pan, and means there located to retain first mentioned means in position.

4. A bake pan comprising a bottom, sides, ends, and beads along the upper edges thereof, a reinforcing strip for one side of said pan having its upper edge embraced by the bead on said side, a bead along the lower edge of said strip, a wire engaging said bead, and extending parallel to the ends of said pan, and adjacent thereto, to the opposite side of said pan, and means there located to retain said wire in position.

5. A bake pan comprising a bottom, sides, ends, and beads along the upper edges thereof, a reinforcing strip for one side of said pan having its upper edge embraced by the bead on said side, an inturned bead along the lower edge of said strip, a series of vertical corrugations throughout the length of said strip merging into said strip near its upper edge and terminating abruptly above said inturned bead, and means engaging said bead and connecting the same with the opposite side of said pan.

6. A bake pan comprising a bottom, sides, ends, and beads along the upper edges thereof, a reinforcing strip for one side of said pan having its upper edge embraced by the bead on said side, a depending strip on the opposite side of said pan having its upper edge embraced by the bead on that side, and means connecting the lower edges of both of said strips.

7. A bake pan comprising a bottom, sides, ends, and beads along the upper edges thereof, a reinforcing strip for one side of said pan having its upper edge embraced by the bead on said side, an inturned bead along the lower edge of said strip, a wire bent in the form of an open rectangle, engaged by said inturned bead and embracing said pan, and means for retaining said wire in contact with said pan on the side opposite said reinforcing strip.

FRANK P. THIEN.
FRANK G. GUENTHER.

Witnesses:
KATE S. HOLMES,
WILLIAM O. STARK.